United States Patent [19]

Takeuchi

[11] 3,860,746

[45] Jan. 14, 1975

[54] URGENCY ANNOUNCING APPARATUS

[75] Inventor: Takeshi Takeuchi, Yokohama, Japan

[73] Assignee: Hochiki Corporation, Tokyo, Japan

[22] Filed: May 21, 1973

[21] Appl. No.: 362,252

[30] Foreign Application Priority Data

May 20, 1972 Japan ............................ 47-49546
May 20, 1972 Japan ............................ 47-58388
May 20, 1972 Japan ............................ 47-58389

[52] U.S. Cl. .............. 178/5.6, 178/DIG. 13, 325/57
[51] Int. Cl. ............................................ H04n 7/18
[58] Field of Search ........... 178/5.6, 5.8 R, DIG. 23, 178/DIG. 13; 325/308, 64, 57, 53

[56] References Cited

UNITED STATES PATENTS

| | | | |
|---|---|---|---|
| 2,003,877 | 6/1935 | Blatterman | 178/DIG. 13 |
| 2,189,310 | 2/1940 | Curtis | 178/DIG. 13 |
| 3,218,388 | 11/1965 | Jobe et al. | 178/5.8 R |
| 3,521,168 | 7/1970 | Kaiser et al. | 325/57 X |

OTHER PUBLICATIONS

Electronics p. 66, 4/29/68.

*Primary Examiner*—Robert L. Richardson
*Attorney, Agent, or Firm*—Frank J. Jordan

[57] ABSTRACT

An urgency announcing apparatus for use in wired television signal transmitting system includes providing at the head end of the system, such as a community antenna television system or a master antenna television system, a modulator for modulating frequencies of urgency announcing signals transmitted from an image signal generator such as an industrial television camera, a video tape recorder, or the like to those in the intermediate frequency band for television receivers and also providing at the side of each television receiver of the system a change-over switchgear for interrupting television signals when urgency announcing signals are transmitted and sending urgency announcing signals to the intermediate frequency amplifying stage of the television receiver.

6 Claims, 4 Drawing Figures

URGENCY ANNOUNCING APPARATUS

Figure 1:
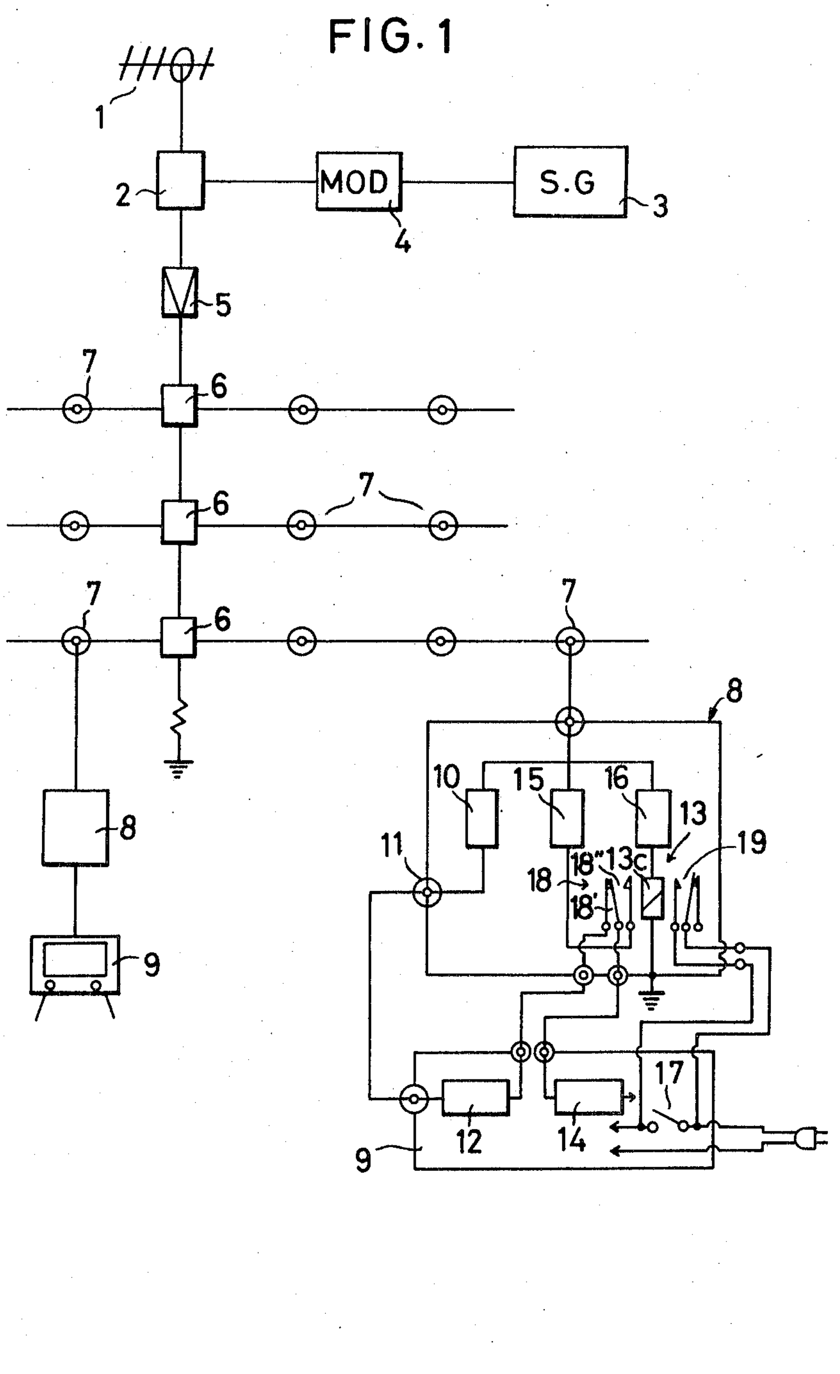

The present invention relates to an urgency announcing apparatus for use in wired television signal transmitting systems capable of sending urgency announcing signals from a caretaker's private room to each subscriber's television receiver regardless of the television signal receiving condition of each of the television receivers.

It is considered that wired television signal transmitting systems such as community or master antenna television systems or the like can be used in various fields such as television rebroadcasting, private broadcasting, alarm systems in a bidirectional system, or the like. In case it is used as an alarm system, the system must be so arranged as to respond to each of the signals transmitted from the subscribers as well as to send urgency announcing signals through the system to each of subscribers.

One of the systems which is generally considered as an urgency announcing system comprises using a free channel, as an individual private broadcasting channel, to send responding and announcing signals to each of subscribers' television receivers. However, in this case, when the subscriber does not have his television receiver turned on, that is, the manual switch for the electric power to the television receiver is opened, it is impossible to send responding and announcing signals to his television receiver. Even if his television receiver is in a switch-on condition, but when the channel which is now selected by him is different from that which is to receive responding and announcing signals, it is troublesome and very inconvenient in an emergency for him to change the now selected channel to the responding and announcing channel, though an indication that he should effect such changeover of channels can be sent to him in some different way.

The other known system is to send announcing signals to all of the channels of television receiver, but in this case it is necessary to provide in the system very expensive apparatus capable of converting radio frequency electromagnetic waves to video signals once at the head end side of the system and introducing superimposed dialogues into the system. Further, in order to arrange the television receiver in such a way that the new selected channel is automatically changed to the urgency announcing channel by the indication transmitted from the head end side of the system, there must be provided a special home converter capable of being used in the community or master antenna television systems. This results in a much higher cost for the system.

The object of the present invention is to eliminate the above-mentioned drawbacks and to provide an urgency announcing apparatus which can be fully incorporated into a community antenna television system as well as master antenna television systems provided in hotels, motels, or the like.

The urgency announcing apparatus of the present invention can provide urgency announcements regardless of the opened or closed condition of the switch on the television receiver in such a way that output signals transmitted from an industrial television camera, a video tape recorder or the like provided at the head end side of the system are modulated to radio frequency electromagnetic waves having frequencies in the intermediate frequency hand for television receivers and signals for closing the electric power circuit of the television receiver are mixed at the same time to flow through the community antenna television system and to put into action a special switch provided in the television receiver.

Figure 2:
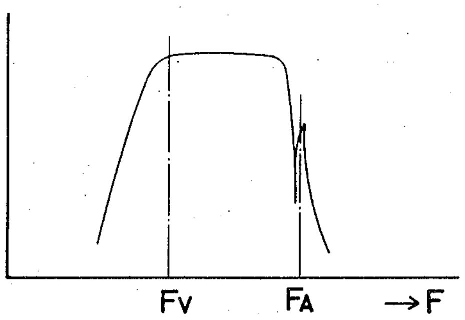
Figure 3:
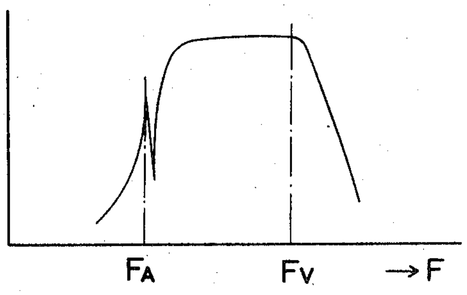
Figure 4:
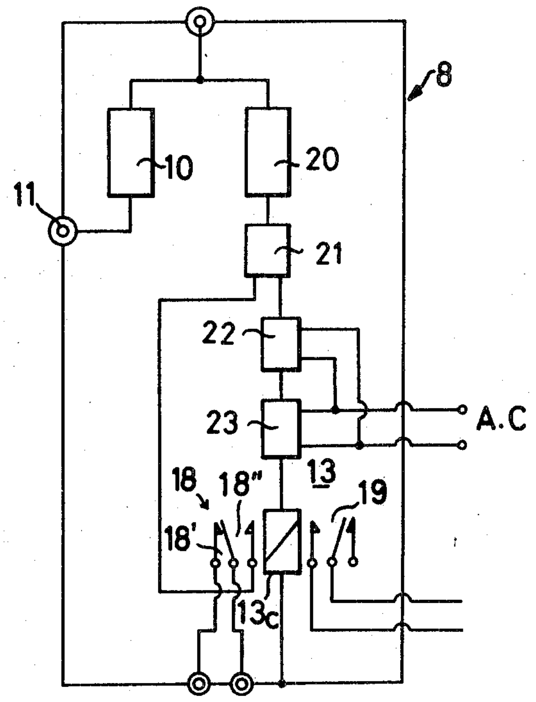

FIG. 1 is a block diagram showing the first embodiment of the urgency announcing apparatus of the present invention, FIG. 2 is a frequency spectrum view of television electromagnetic waves, FIG. 3 is also a spectrum view of signals having frequencies in the intermediate frequency band for television receivers, and FIG. 4 is a block diagram showing the second embodiment of the urgency announcing apparatus of the present invention.

The embodiments of the present invention will now be described with reference to the accompanying drawings.

FIG. 1 is a block diagram showing a general community antenna television system having the first embodiment of the urgency announcing apparatus of the present invention incorporated therein. In FIG. 1 reference numeral 1 represents an antenna for receiving rebroadcasting television signals, 2 a mixer for mixing television signals transmitted through the antenna and urgency announcing signals, and 3 an image signal generator such as an industrial television camera, a video tape recorder, or the like. The numeral 4 represents a radio frequency converter for converting frequencies of image signals generated by the generator 3 to those ranging in the intermediate frequency band for television receivers, 5 an amplifier, 6 coupling devices, 7 serial units or subscribers' terminals, and 8 a control box in which rebroadcasting television signals, urgency announcing signals and electric power opening or closing signals are separated from one another. The control box 8 is provided with a switch for opening or closing the electric power of a television receiver. The numeral 9 represents a television receiver.

The control box 8 is provided with a filter 10 for allowing signals having frequencies in the frequency band for television to pass therethrough, a filter 15 for letting signals having frequencies in the intermediate frequency band for television receivers to pass therethrough and, a filter 16 for permitting signals except those having frequencies in the above-mentioned two frequency bands to pass therethrough. A relay 13 is also provided and this relay 13 includes a coil 13C, a change-over contact 18 comprising a normally-closed contact 18' and a normally-opened contact 18'', and a normally-opened contact 19.

FIG. 2 is a spectrum view of television electromagnetic waves showing the relationship between video carrier waves FV and audio carrier waves FA. FIG. 3 is also a spectrum view of the intermediate frequency stage in the output portion of the tuner of the television receiver, in which the relationship between carrier waves FV and FA is inverse to that as shown in FIG. 1.

The system functions as follows. Television electromagnetic waves received through the antenna 1 flow, in the same way as in the general community antenna television system, through the mixer 2 and the amplifier 5 to be distributed by the signal coupling device 6 and again by the serial unit or the subscribers' terminals 7 to be brought out as television signals. These television signals then reach the control box 8 connected to the serial unit 7, wherein they are carried through the filter 10, which is so arranged as to allow signals having frequencies in the frequency band for television to pass therethrough, and an external connection terminal 11 to pass into the tuner 12 in the television set 9. When the urgency announcing system is not in operation, the relay driving coil 13 in the control box 8 is not operated. Accordingly, the signals flow through the normally-closed relay contact 18, to which the output end of the tuner 12 is connected, to an intermediate frequency stage 14 to be received as usual. The other relay contact 19 is normally opened and the electric power of the television set is manually switched on or off by the switch 17.

The urgency announcement can be carried out in the system of the present invention as follows. Image signals transmitted from the image signal generator 3 such as a video tape recorder, an industrial television camera, or the like are modulated by the radio frequancy converter 4 to those having frequencies in the intermediate frequency band and sent through the mixer 2 to each of subscribers' television receivers. On the other hand, signals for operating and controlling relays — said signals may be either serial signals or radio frequancy signals except television signals — are generated at the same time by the control portion, mixed by the mixer 2, sent in the same way as television signals, and taken out by the serial unit. In cases where the kind of relay driving and controlling signals used is serial, the transmitting system must be capable of letting serial signals pass therethrough. In case of radio frequency signals are used, the system must be one capable of allowing these radio frequency signals as well as signals having frequencies in the intermediate frequency band for television receivers to pass therethrough.

Urgency announcing signals taken out by the serial unit 7 reach the control box 8, in which they flow through the filter 15 to the normally-opened contact 18'', while relay operating and controlling signals pass through the filter 16 to operate the relay coil 13C. When the relay 13 is operated, the normally-opened contact 19, which is connected in parallel to the switch 17 of the television receiver, is closed and the television receiver is put into a switch-on condition regardless of whether it is turned on or off by its manual switch 17. Urgency announcing signals having frequencies in the intermediate frequency band are then carried direct to the intermediate frequency amplifying stage 14 due to the fact that the normally-opened contact 18'' closed by the relay 13. In this case the normally-closed contact 18' for signals transmitted through the antenna is opened and television receivers therefore receive only urgency announcing signals.

The second embodiment of the urgency announcing apparatus of the present invention will now be described by referring to FIG. 4.

The system having the second embodiment of the urgency announcing apparatus included therein is the same as that as shown in FIG. 1 but different from the latter as regards the control box 8. The control box 8 comprises a filter 10 for letting signals having frequencies in the frequency band for rebroadcasting television signals pass therethrough, a filter 20 for allowing signals having frequences in the intermediate frequency band to pass therethrough, a splitter 21, a high frequency amplifier 22, an electric power amplifier 23, and a relay 13. The relay 13 includes a coil 13C, a changeover contact 18 comprising a normally-closed contact 18' and a normally-opened contact 18'', and a normally-opened contact 19. The television receiver 9 is provided with, as is well known, a tuner 12, an intermediate frequency amplifying stage 14, an electric power switch 17, or the like. The letters A.C represent an alternating electric power sources.

Television electromagnetic waves received through the antenna 1 flow, in the same way as in the community antenna television system, through the mixer 2 and the amplifier 5 to be distributed by signal coupling devies 6 and again by serial units 7 to be brought out as television signals. These television signals then reach the control box 8 connected to the serial unit 7, wherein they are carried through the filter 10, which is so arranged as to allow signals having frequencies in the television frequency band to pass therethrough, and an external connection terminal 11 to pass into the tuner 12 in the television set 9. When the urgency announcing system is not in operation, the relay driving coil 13 in the control box 8 is not put into action. Accordingly, the signals flow through the normally-closed relay contact 18, to which the output end of the tuner 12 is connected, to the intermediate frequency amplifying stage 14 to be imaged on the television screen as usual. The other relay contact 19 is normally opened and the electric power of the television set is manually switched on or off by the switch 17.

The urgency announcement can be carried out in the system having the second embodiment of the urgency announcing apparatus of the present invention included therein as follows. The image signal generator 3 such as the video tape recorder, the industrial television camera, or the like provided at the head end side of the system is operated to generate alarm image signals, which are modulated by the radio frequancy modulator 4 to radio frequency signals having frequencies in the intermediate frequency band for television receivers and mixed with rebroadcasting television signals by the mixer 2 to be sent to each of subscribers' television receivers. These mixed signals flow through the amplifier 5, and the coupling device 6 to the serial unit 7, in which they are separated by filters 10 and 20 to rebroadcasting television signals and alarm signals, respectively. Alarm signals are carried through the filter 20 to the splitter 21, by which they are split into two groups of alarm signals, one of which is applied to the high frequency amplifier 22 as input signals and the other to the relay contact 18''. The high frequency amplifier 22, upon receiving such input signals, generates an output, which, after being amplified by the electric power amplifier 23, puts the relay coil 13C into action. As a result, the normally-opened contact 18'' is closed to thereby add alarm signals through this contact 18'' to the intermediate frequency amplifying stage 14, while the normally-opened contact 19 is also closed to thereby put the television receiver 9 into the switch-on condition, thus providing imaging alarm signals on the television screen regardless of whether the subscribers' television receivers are switched on or off and regardless of which channels are selected by them.

As stated above, the present invention makes it possible to provide at a lower cost an urgency announcing system capable of sending urgency announcing signals to each of subscribers' television receivers through the general community antenna television system without any changes to the CATV system, regardless of whether the subscribers' television receivers are switched on or off and regardless of which channels are selected by them.

What is claimed is:

1. An urgency announcing apparatus for use in a wired television signal transmitting system having a head end and trunk lines leading to subscribers television sets comprising modulating means for converting alarm signals into frequencies in the radio frequency band, a mixing means which receives broadcast television signals and said converted alarm signals from said modulating means, control means operatively connected to said mixing means, said control means including a first filter means passing only broadcast television signals, second filter means passing only converted alarm signals, first and second relay switches controlled by the output from said second filter means, an intermediate frequency amplifier means, said first switch having a first normal operable position providing a first connection to said intermediate frequency amplifier means to relay broadcast television signals via said fist filter means, said first switch having a second alarm position in which said first connection is terminated and a second connection is established between the output of said second filter means and said intermediate frequency amplifier to relay alarm signals, said second switch having a normal position which disconnects a power source from the television set and an alarm position which connects said power source to the television set while by-passing the normally operated on-off switch on the television set, whereby converted alarm signals from said mixing means pass to the television set via said second filter means, said first switch, and said intermediate frequency amplifier means to interrupt any television broadcast signals regardless of the position of the manually operated on-off switch on the television set.

2. An urgency announcing apparatus according to claim 1 wherein said second filter means comprises a first filter element and a second filter element each of which passes only said converted alarm signals, said first filter means and said first and second filter elements being connected in parallel, a relay connected to the output of said third filter element for operating said first and second switches, whereby actuation of said relay moves said first switch from said first normal operable position to said second alarm position and moves said second switch from said normal position to said alarm position.

3. An urgency announcing apparatus according to claim 2 including circuit means between said second filter element and said intermediate frequency amplifier means, said first switch when in said second alarm position completing said circuit means to provide a path through said second filter element, said first switch, and said intermediate frequency amplifier means.

4. An urgency announcing apparatus according to claim 1 wherein a single relay simultaneously actuates said first and second switches.

5. An urgency announcing apparatus according to claim 1 including splitter means connected to said second filter means, one circuit means connecting said splitter to said first switch and another circuit connected to a high frequency amplifier, a relay for actuating said first and second switches, a circuit between said high frequency amplifier and said relay including an electric power amplifier for amplifying the signals from the high frequency amplifier, whereby alarm signals passing through said second filter means actuate said relay to move said first switch from said first normal operable position to said second alarm position and to move said second switch from said normal position to said alarm position.

6. An urgency announcing apparatus according to claim 5 wherein said one circuit means includes said first switch whereby when the latter is in its second alarm position, a path is provided between said second filter means, said first switch and said intermediate frequency amplifier means.

* * * * *